US007829848B2

(12) United States Patent
Takada et al.

(10) Patent No.: US 7,829,848 B2
(45) Date of Patent: Nov. 9, 2010

(54) GAS MONITORING APPARATUS

(75) Inventors: Yasuaki Takada, Kiyose (JP); Masao Suga, Hachioji (JP); Hisashi Nagano, Higashimurayama (JP); Izumi Waki, Tokyo (JP); Hidehiro Okada, Tokyo (JP); Tatsuo Nojiri, Takasaki (JP); Yasuo Seto, Kashiwa (JP); Yasuhiro Sano, Kawagoe (JP); Shigeharu Yamashiro, Tokyo (JP); Isaac Ohsawa, Kashiwa (JP)

(73) Assignees: Hitachi, Ltd., Tokyo (JP); National Research Institute of Police Science, Chiba (JP)

( * ) Notice: Subject to any disclaimer, the term of this patent is extended or adjusted under 35 U.S.C. 154(b) by 219 days.

(21) Appl. No.: 12/285,332

(22) Filed: Oct. 2, 2008

(65) Prior Publication Data

US 2009/0039253 A1 Feb. 12, 2009

Related U.S. Application Data

(62) Division of application No. 11/336,989, filed on Jan. 23, 2006, now Pat. No. 7,449,685.

(30) Foreign Application Priority Data

May 20, 2005 (JP) ............................ 2005-148515

(51) Int. Cl.
*H01J 49/00* (2006.01)
*B01D 59/44* (2006.01)

(52) U.S. Cl. ....................... 250/288; 250/281; 250/425; 250/423 R; 73/73

(58) Field of Classification Search ................. 250/288, 250/281, 425, 423 R; 73/73
See application file for complete search history.

(56) References Cited

U.S. PATENT DOCUMENTS 4,934,182 A * 6/1990 Eggertsen et al. .............. 73/73

(Continued)

FOREIGN PATENT DOCUMENTS

DE 103 10 394 A1 3/2003

(Continued)

OTHER PUBLICATIONS

Utriainen, Mikko et al., "Combining Miniaturized Ion Mobility Spectrometer and Metal Oxide Gas Sensor for the Fast Detection of Toxic Chemical Vapors", Elsevier Science B.V., vol. 93, 2003, pp. 17-24.

(Continued)

*Primary Examiner*—Nikita Wells
(74) *Attorney, Agent, or Firm*—Stites & Harbison, PLLC; Juan Carlos A. Marquez, Esq.

(57) ABSTRACT

A gas monitoring apparatus includes a sample introducing portion, a measurement portion, an ionization portion, a mass analysis portion, a data processing portion and a display. The sample introducing portion introduces a sample gas including an object material to be measured. The measurement portion measures a concentration of a predetermined coexisting material, which coexists with the object material in the sample gas. The ionization portion ionizes the sample gas. The mass analysis portion analyzes mass of an ion produced by the ionization portion. The data processing portion analyzes signals detected by the mass analysis portion to calculate a concentration of the object material. And the display displays results of analysis conducted by the data processing portion. The data processing portion includes an adjustment portion which adjusts the concentration of the object material according to the concentration of the predetermined coexisting material.

3 Claims, 11 Drawing Sheets

U.S. PATENT DOCUMENTS

| | | | | |
|---|---|---|---|---|
| 5,010,776 | A | 4/1991 | Lucero et al. | |
| 5,281,915 | A | 1/1994 | Takahama et al. | |
| 5,965,882 | A | 10/1999 | Megerle et al. | |
| 6,291,821 | B1 | 9/2001 | Danylewych-May et al. | |
| 6,580,067 | B1 | 6/2003 | Yamada et al. | |
| 7,111,496 | B1 | 9/2006 | Lilienfeld et al. | |
| 7,227,136 | B2 * | 6/2007 | Walte et al. | 250/288 |
| 7,449,685 | B2 * | 11/2008 | Takada et al. | 250/288 |
| 2002/0048818 | A1 | 4/2002 | Sakairi et al. | |
| 2003/0015657 | A1 | 1/2003 | Takada et al. | |
| 2004/0129890 | A1 | 7/2004 | Herman et al. | |
| 2005/0009172 | A1 | 1/2005 | Yamakoshi et al. | |
| 2005/0156107 | A1 | 7/2005 | Miller et al. | |
| 2006/0097144 | A1 | 5/2006 | Kingston et al. | |
| 2006/0224332 | A1 | 10/2006 | Johnson et al. | |
| 2009/0065688 | A1 * | 3/2009 | Hashimoto et al. | 250/282 |

FOREIGN PATENT DOCUMENTS

| | | |
|---|---|---|
| JP | 10-265839 | 3/1997 |
| JP | 2000-162189 | 11/1998 |
| JP | 2004-158296 | 11/2002 |
| JP | 2004-286648 | 3/2003 |
| WO | WO 94/16320 | 1/1994 |

OTHER PUBLICATIONS

Office Action from the Chinese Patent Office dated Nov. 7, 2008.

Utriainen, Mikko, et al, "Combining miniaturized ion mobility spectrometer and metal oxide gas sensor for the fast detection of toxic chemical vapors" Elsevier Science B.V., 2003, pp. 17-24.

European Search Report, Dated Aug. 22, 2006.

* cited by examiner

GAS MONITORING APPARATUS

CROSS-REFERENCE TO RELATED APPLICATION

This application is a Divisional application of U.S. application Ser. No. 11/336,989 filed Jan. 23, 2006 now U.S. Pat. No. 7,449,685. The present application claims priority from U.S. application Ser. No. 11/336,989 filed Jan. 23, 2006, which claims priority from Japanese Patent Application No. 2005-148515 filed on May 20, 2005, the content of which is hereby incorporated by reference into this application.

BACKGROUND OF THE INVENTION

The present invention relates to a gas monitoring apparatus, and more particularly, to a gas monitoring apparatus, which is able to conduct real-time measurement for a concentration of a chemical warfare agent with a mass spectrometer and to display results of monitoring.

It seems that threat of terrorism has been increasing on a global scale recently. Because chemical terrorism resorting to a chemical warfare agent, which may be more easily produced compared with nuclear weapons, may cause immense damage if it occurs, countries are keeping a strict watch on this type of terrorism. The fact that crimes associated with a chemical warfare agent such as the Matsumoto sarin attack and the subway sarin attack were committed in this country requires urgent implementation of protection against a crime of this type.

It is found that chemical weapons which may have been produced by the former Japanese military during the war are buried in China and domestically in this country. Health impairment, which has been induced by chemical warfare agents leaked into the environment at construction sites, is reported in some districts. It is requested that abandoned chemical weapons and chemical warfare agents contained in the weapons be promptly and safely excavated, collected and detoxified.

If the chemical warfare agents are criminally used or accidentally leaked, it is necessary to carry out real-time acquisition of their species and concentration in the atmosphere so that it helps evacuation of residents, medical treatment of contaminated people and detoxification of the chemical warfare agents.

Gas chromatography/mass spectrometry (GC/MS), liquid chromatography/mass spectrometry (LC/MS) and the like have been widely used as methods for detecting a chemical warfare agent.

However, these methods, which include a process to separate a sample by chromatography, are not always suitable for real-time detection of a chemical warfare agent.

To overcome the drawback described above, an apparatus for detecting a chemical warfare agent is disclosed, which employs a mass spectrometry without a separating section using chromatography such as GC or LC (see patent documents 1 and 2).

Generally speaking, an ionization portion which supplies an ionized sample is disposed in tandem immediately in upstream of a mass spectrometer, which measures a mass to charge ratio (m/z). Such ionization methods are publicly known as electron impact ionization (EI), chemical ionization (CI), electrospray ionization (ESI), atmospheric pressure chemical ionization (APCI), matrix assisted laser desorption ionization and the like.

An invention disclosed in the patent document 1 employs atmospheric pressure chemical ionization in order to ionize a sample. The atmospheric pressure chemical ionization, which ionizes a sample under atmospheric pressure, a soft condition, by chemical reaction, has advantages that it decreases fragmentation of the sample, allowing easier production of ions which provide information on molecular weight of a sample (hereinafter referred to as "molecular weight related ion"). This means that this type of ionization is suitable for acquisition of concentration of an object chemical warfare agent. In contrast, other ionization methods such as electron impact ionization (EI), which is widely applied to liquid chromatography mass spectrometry (LC/MS), are suitable for analysis of structure of a chemical warfare agent. This is attributed to the fact that these methods directly apply high energy to a sample, so that the sample relatively tends to fragment.

More specifically speaking, atmospheric pressure chemical ionization generates secondary ions such as molecular weight related ions by chemical reaction between a sample and primary ions, which are generated by corona discharge. As a typical example of molecular weight related ion, an ion $[(M+H)+]$ or an ion $[(M-H)-]$ can be listed, which results from a sample molecule by adding or desorbing a proton. If ion intensity of a molecular weight related ion is known, it is possible to obtain concentration of a chemical warfare agent (object material) to be detected in a sample.

Description is given of a conventional apparatus for detecting chemical warfare agents disclosed in the patent document 1, with reference to FIG. 11.

As shown in FIG. 11, an apparatus 100 for detecting chemical warfare agents includes a sample introduction portion 101, an ionization portion 102, a mass analysis portion 103, a control portion 104, a suction pump 105, a computer 106 for processing measurement and a vacuum pump 107.

As shown in FIG. 11, a sample 16 inserted into the sample introduction portion 101 is vaporized by heating. The vaporized sample 16 is introduced into the ionization portion 102 by the suction pump 105. The sample 16 is ionized within an area of corona discharge in the ionization portion 102. Produced ions, which are guided into the mass analysis portion 103 having a mass spectrometer, undergo mass spectrometry. Data resulting from the mass spectrometry is processed and displayed by the computer 106. If the data exhibits characteristics of a chemical warfare agent, the computer 106 determines that the chemical warfare agent has been detected.

The vacuum pump 107 depressurizes a differentially pumping region in the mass analysis portion 103 and maintains high vacuum of a chamber where the mass spectrometer of the portion 103 is installed.

The control portion 104 carries out ON/OFF control, setting of temperature, voltage and vacuum pressure, and status monitoring for functional portions of the apparatus 100.

In addition, an apparatus for monitoring exhaust gas is disclosed, which employs mass spectrometry with atmospheric pressure chemical ionization (patent document 3, for example). This invention allows introduction of an exhaust gas into a mass spectrometer with atmospheric pressure chemical ionization, so that the apparatus is able to display concentration of a dioxin-related compound.

Furthermore, a method for analyzing a gas with a mass spectrometer is disclosed, which comes from a reaction room during surface treatment of stainless steel (see patent document 4, for example). This invention enables measurement of vapor partial pressure of the reaction room which has an effect on surface treatment.

Patent document 1: Japanese Published Patent Application 2004-158296

Patent document 2: Japanese Published Patent Application 2004-286648

Patent document 3: Japanese Published Patent Application 2000-162189

Patent document 4: Japanese Published Patent Application H10-265839

As described above, a mass spectrometer with atmospheric pressure chemical ionization disclosed in the patent document 1 is advantageous as a detector for a chemical warfare agent. On the other hand, it is concerned that atmospheric pressure chemical ionization, which ionizes a sample by chemical reaction, tends to be affected by a material coexisting with an object chemical warfare agent (hereinafter referred to as "coexisting material") during the ionization process.

In other words, it is concerned that efficiency of ionization of an object chemical warfare agent (ionization efficiency) carried out in an ionization portion with atmospheric pressure chemical ionization depends on concentration of a coexisting material. If the ionization efficiency depends on the concentration of the coexisting material, it means that ion intensity measured by a mass spectrometer and concentration of the object chemical warfare agent calculated from this ion intensity is also affected by the concentration of the coexisting material.

However, it is the case with a chemical warfare agent, which is possibly turned to a chemical weapon: even fundamental data has not been obtained for this type of material, on which strict control is imposed under international treaties. In this way, data related to ionization efficiency for a chemical warfare agent under presence of a coexisting material described above has not been publicly known, either.

Therefore, even if an anomaly occurs due to dependence of the ionization efficiency of an object chemical warfare agent on the concentration of a coexisting material, it has not been acknowledged as a problem to be solved at the moment, because sufficient data about chemical warfare agents has not yet been obtained.

SUMMARY OF THE INVENTION

The present invention seeks to provide a gas monitoring apparatus, which is able to correctly measure concentration of a chemical warfare agent even if concentration of a coexisting material in a sample gas varies.

An aspect of the present invention is to provide a gas monitoring apparatus, which comprises a sample introducing portion, a measurement portion, an ionization portion, a mass analysis portion, a data processing portion and a display. The sample introducing portion introduces a sample gas including an object material to be measured. The measurement portion measures a concentration of a predetermined coexisting material, which coexists with the object material in the sample gas. The ionization portion ionizes the sample gas. The mass analysis portion analyzes mass of an ion produced by the ionization portion. The data processing portion analyzes signals detected by the mass analysis portion to calculate a concentration of the object material. And the display displays results of analysis conducted by the data processing portion. The data processing portion comprises an adjustment portion which adjusts the concentration of the object material according to the concentration of the predetermined coexisting material.

The apparatus described above is able to measure correct concentration of a chemical warfare agent if concentration of a coexisting chemical material in a sample gas varies.

DESCRIPTION OF THE PREFERRED EMBODIMENTS

Embodiments of the present invention are now described in detail with reference to drawings.

First Embodiment

Figure 1:
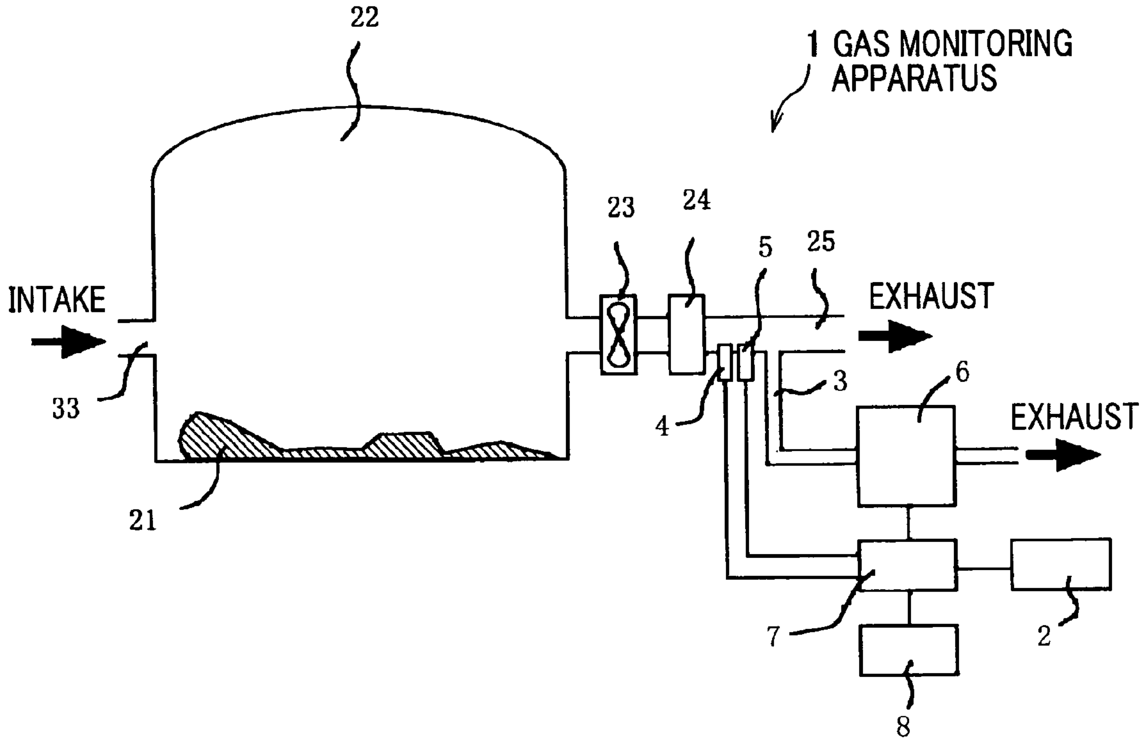
FIG. 1 is a block diagram showing structure of a gas monitoring apparatus according to one embodiment of the present invention.

As shown in FIG. 1, a gas monitoring apparatus 1*a* includes database DB2 for chemical warfare agents, a line 3 for guiding gas, a humidity sensor 4, a temperature sensor 5, a detecting portion 6 for chemical warfare agent, a data processing portion 7 and a display 8.

Because a tent 22 for surrounding soil and the like are not included in the gas monitoring apparatus 1 according to this embodiment of the present invention, description is not given of them here, but detail description will be given later in a paragraph "Example of Application".

a. Database DB for Chemical Warfare Agents

The database DB2 stores various information related to signals inherent to various chemical warfare agents. The information includes, for example, a graph representing concentration of a chemical warfare agent with respect to detected ion intensity and a graph representing an adjustment factor for ion intensity according to concentration of a coexisting material (a calibration curve between concentration of a coexisting material and ion intensity), which includes a calibration curve between absolute humidity and ion intensity. As described above, ion intensity is a parameter which varies according to ionization efficiency of a chemical warfare agent. In this connection, the database DB2 can be implemented by a hard disk device.

As described above, chemical warfare agents handled in this embodiment include materials, on which strict control is imposed under international treaties. For this reason, information stored in the database DB2 is established based on data, which has been measured beforehand at a research facility satisfying a certain standard.

The chemical warfare agents include a decomposed product deriving from a chemical warfare agent. The reason for this is that if a decomposed product is detected, it is possible to certify existence of a chemical warfare agent.

b. Line for Guiding Gas

As shown in FIG. 1, the line 3 for guiding gas is for sending an introduced sample gas to the detecting portion 6 for chemical warfare agent. An end of the line 3 is, for example, connected with a gas passage such as an exhaust pipe 25 of the tent 22, in which a chemical warfare agent to be detected exists. In this way, it is possible to introduce the sample gas into the line 3, which preserves the nature of a gas discharged from the tent 22. On the other hand, the other end of the line 3, which is connected with the detecting portion 6, sends the sample gas guided into the line 3 to the detecting portion 6.

Transfer of the sample gas can be easily implemented by a suction pump 46 (see FIG. 2), which lies in the detecting portion 6.

c. Humidity Sensor

The humidity sensor 4 measures humidity of the same gas as the sample gas introduced into the line 3. For this reason, a satisfactory location of the humidity sensor 4 is in the line 3 or a gas passage such as the exhaust pipe 25 with which the line 3 is connected. The humidity sensor 4 is electrically connected with the data processing portion 7. Humidity measured by the humidity sensor 4 is typically relative humidity (%) relative to the saturation water vapor pressure under a temperature condition at a measurement.

The measured relative humidity data is transmitted to the data processing portion 7.

d. Temperature Sensor

Similar to the humidity sensor 4, the temperature sensor 5, which is disposed in the line 3 or the gas passage such as the exhaust pipe 25 with which the line 3 is connected, is electrically connected with the data processing portion 7. The measured temperature data is transmitted to the data processing portion 7.

Because the temperature sensor 5 provides temperature with which adjustment is made for a value measured by the humidity sensor 4 to obtain absolute humidity, the temperature sensor 5 is disposed next to and close to the humidity sensor 4.

e. Detecting Portion for Chemical Warfare Agent

The detecting portion 6 for chemical warfare agent has an ionization portion 6*a* (see FIG. 2) and a mass analysis portion 6*b* (see FIG. 3) in tandem. The detecting portion 6 ionizes a sample gas and the mass analysis portion 6*b* carries out mass spectrometry.

Figure 2:
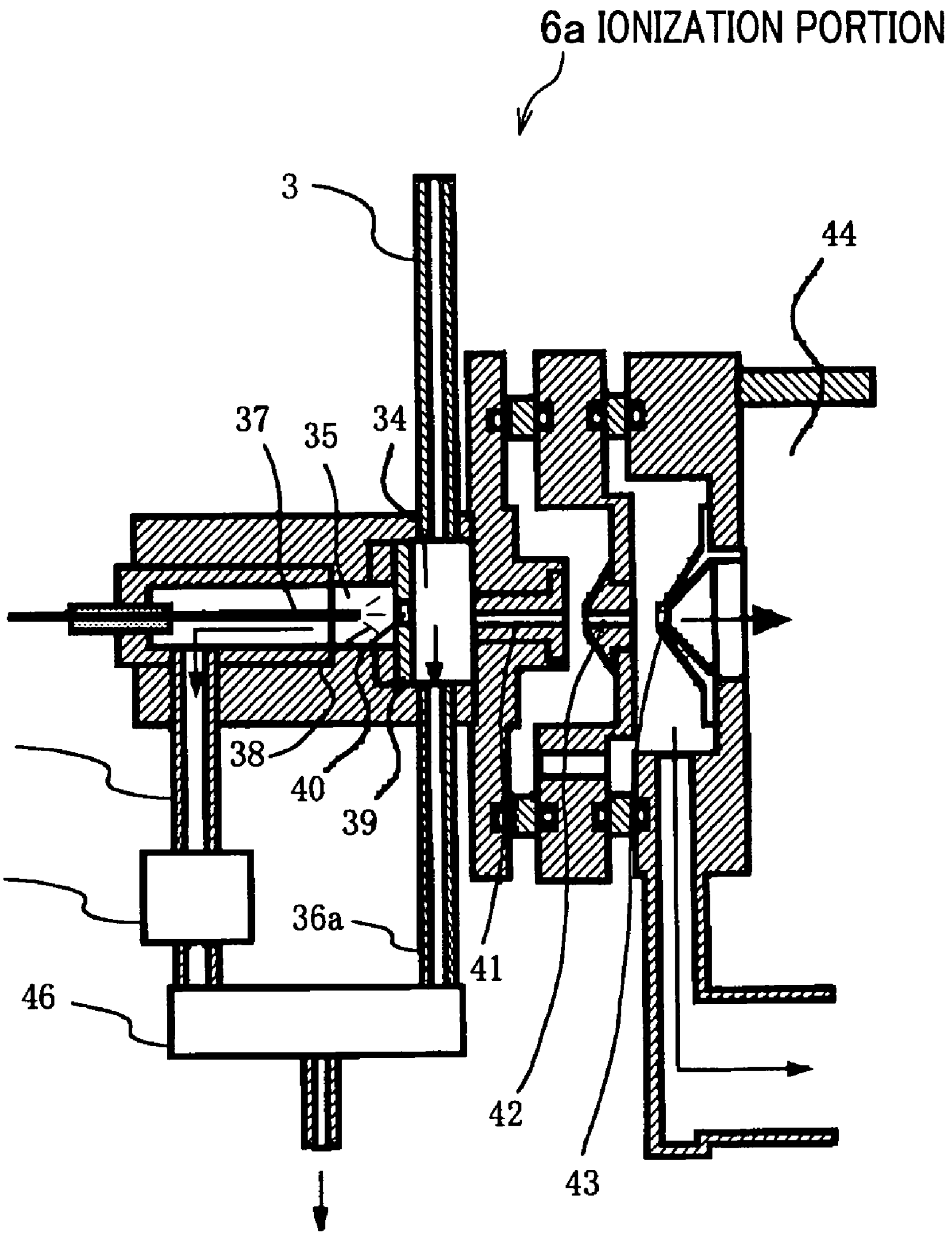
FIG. 2 is a vertical sectional view showing structure of an ionization portion carrying out atmospheric pressure chemical ionization.

As shown in FIG. 2, the ionization portion 6*a* includes an ion drifting portion 34, a corona discharge portion 35, a needle electrode 37, a counter electrode 39, exhaust pipes 36*a* and 36*b*, and first, second and third small holes 41, 42 and 43.

Description is first given of steps for ionizing a sample gas by the ionization portion 6*a*.

The sample gas introduced through the line 3 is introduced into the ion drifting portion 34, whose pressure is approximately the atmospheric pressure.

A portion of the sample gas introduced into the ion drifting portion 34 is introduced into the corona discharge portion 35 via an opening 40. The remaining portion of the sample gas is discharged from the ionization portion 6*a* via the exhaust pipe 36*a*.

The sample gas introduced into the corona discharge portion 35 is ionized in a corona discharge spot 38, which is created around an end of the needle electrode 37, on which high voltage is imposed. At this moment, the sample gas is introduced so that it travels approximately against a flow of ions, which drift from the needle electrode 37 to the counter electrode 39.

The produced ions are introduced into the ion drift portion 34 by an electric field via the opening 40 of the counter electrode 39. If voltage is imposed between the counter electrode 39 and an electrode having the first small hole 41, it is possible to drift the ions so as to efficiently guide into the first small hole 41.

The sample gas which has not been introduced into the first small hole 41 is discharged by a pump via the exhaust pipes 36*a* and 36*b* into the outside of the apparatus.

Because a flow rate of the sample gas introduced into the corona discharge portion is important to provide a highly sensitive and stable detection for an object material, it is preferable but not mandatory to connect a flow rate controller 45 with the exhaust pipe 36*b*.

It is preferable but not mandatory that the ion drift portion 34, the corona discharge portion 35, and the line 3 are heated by electric heaters (not shown) from the view point of preventing adsorption of the sample gas.

Although it is possible to determine a flow rate of the sample gas passing through the line 3 and the exhaust pipe 36*a* by adjusting capacity of the suction pump 46 such as a diaphragm pump and conductance of a line, it may be alternatively possible to adopt a controller such as the flow rate controller 45 for the line 3 and the exhaust pipe 36*a*.

Disposition of the suction pump 46 in downstream of an ion producing portion (the corona discharge portion 35 is a counterpart in an exemplary configuration shown in FIG. 2) relative to the flow of the sample gas enables a decrease in an adverse effect on measurement due to contamination (desorption of the sample gas) within the suction pump 46.

The ions produced by the ionization portion 6*a* described above are sent to the mass analysis portion 6*b* via the first, second and third small holes 41, 42 and 43. In this connection, the electrodes having the first, second and third small holes 41, 42 and 43, on which voltage is imposed by a power supply (not shown), are able not only to increase ion transmission efficiency of differential pumping regions 49*a* and 49*b* (see FIG. 3), but also to decluster cluster ions created by adiabatic expansion. It is preferably but not necessarily to adopt 0.3 mm for diameters of the small holes 41, 42 and 43. Also, it is preferable but not mandatory that the electrodes having the small holes 41, 42 and 43 are heated to 100 to 300 degrees Celsius by heaters (not shown).

Figure 3:
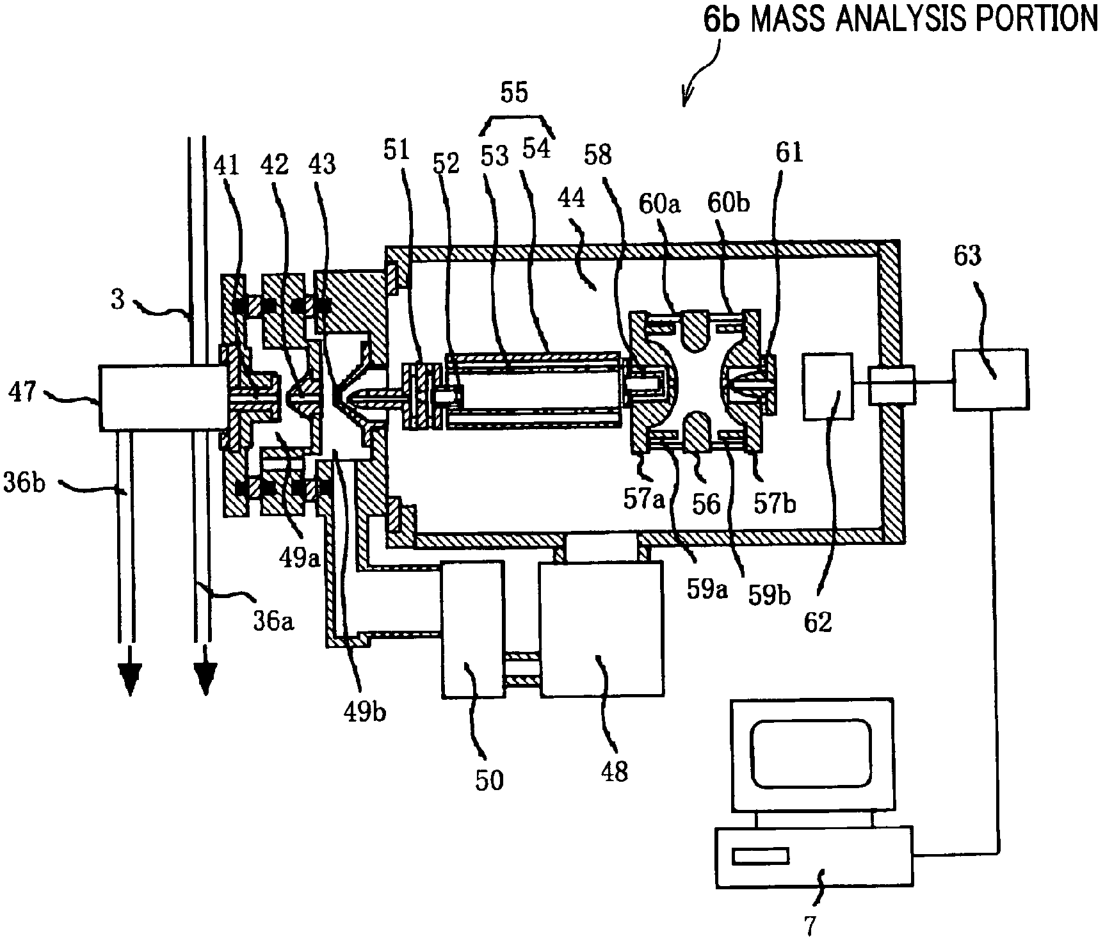
FIG. 3 is a vertical sectional view showing an exemplary mass analysis portion including an ion trap mass spectrometer, according to the present invention.

A space defined by the electrodes having the small holes 41 and 42, and the other space defined by the electrodes having the small holes 42 and 43 form the differential pumping regions 49*a* and 49*b* (see FIG. 3), respectively, which are discharged by a rough pump 50 (see FIG. 3).

As the rough pump 50, a rotary pump, a scroll pump or a mechanical booster pump is typically used. For example, a scroll pump having a pumping speed 900 litters/minute can be adopted for the rough pump 50. It is preferable but not necessary to select 100 Pascal for the pressure between the second and third small holes 42 and 43. It may be alternatively possible to remove the electrode having the second small hole 42, so that a differential pumping region is defined by the first and third small holes 41 and 43.

Although any method is acceptable for ionization of the sample gas, it is possible to advantageously apply the present invention to a method, in which ionization efficiency varies according to presence of a coexisting material; such as chemical ionization, which ionizes a sample gas by chemical reaction similar to atmospheric pressure chemical ionization. If such a method is adopted, it results in a removal of effect on ionization efficiency due to the presence of the coexisting material.

f. Mass Analysis Portion

The mass analysis portion 6*b* includes a mass spectrometer, which analyzes mass of an ionized sample gas (hereinafter referred to as "ion").

Description is given of steps for mass analysis of an ion carried out by the mass analysis portion 6*b*.

Ions which have been created in the ionization portion 6*a* and passed through the third small hole 43 are introduced into a vacuum portion 44, which is evacuated by a vacuum pump 48. For example, it may be possible to adopt a turbo molecular pump having a pumping speed 300 litters/minute for the vacuum pump 48. In this embodiment, the rough pump 50 also serves as a pump for evacuating the back pressure side of the turbo molecular pump.

These ions are focused by a focusing lens 51. An Einzel lens typically consisting of three electrode elements and the like are adopted for the focusing lens 51. The ions further pass through a slit electrode 52. Ions having passed through the third small hole 43 are focused at an opening of the slit electrode 52 by the focusing lens 51 and pass through the opening. On the other hand, colliding against a slit portion of the slit electrode 52, it is hard for neutral particles, which have not been focused, to reach an ion trap mass spectrometer. The ions having passed through the slit electrode 52 are deflected and focused by a double cylindrical deflector 55, which is made of an inner cylindrical electrode 53 having a large number of openings and an outer cylindrical electrode 54. In the double cylindrical deflector 55, deflection and focusing is conducted by an electric field of the outer cylindrical electrode 54, which spreads out of the openings of the inner cylindrical electrode 53. The details of this are disclosed in Japanese Published Patent Application H7-85834.

The ions having passed through the double cylindrical electrode 55 are introduced into the ion trap mass spectrometer, which is made of a ring electrode 56 and endcap electrodes 57*a* and 57*b*. A gate electrode 58 is provided so as to control timing of ions injected into the ion trap mass spectrometer. Brim electrodes 59*a* and 59*b* are provided so as to prevent the ions from reaching quartz rings 60*a* and 60*b*, which hold the ring electrode 56 and the endcap electrodes 57*a* and 57*b*. In this way, it is possible to prevent the quartz rings 60*a* and 60*b* from being charged by the ions. Inside of the ion trap mass spectrometer, where helium is supplied via a helium supply line (not shown), its internal pressure, approximately 0.1 Pascal, is maintained.

The ions introduced into the ion trap mass spectrometer made of the ring electrode 56 and the endcap electrodes 57*a* and 57*b* lose energy as a result of collision with the helium gas, being trapped by an alternating electric field. While scanning is carried out for high-frequency voltage imposed on the ring electrode 56 and the end-cap electrodes 57*a* and 57*b*, the trapped ions are discharged from the ion trap mass spectrometer according to m/z of the ions, and detected by a detector 62 via a lens 61 for extracting ion. Signals detected by the detector 62 are processed in the data processing portion 7 after they are amplified by an amplifier 63.

The ion trap mass spectrometer described above has the following advantages. Because this mass spectrometer has features that its inside (a space encompassed by the ring electrode 56 and the endcap electrodes 57*a* and 57*b*) traps ions, it is possible to detect an object material by prolonging a time for introducing ions, even if concentration of the object material is so low as to result in a small amount of created ions. In this way, it is possible to conduct enrichment of ions with a high magnification at the ion trap mass spectrometer when ion concentration is low, which leads to a remarkable simplification for pre-processing of ions (enrichment, for example).

The mass spectrometer residing in the mass analysis portion 6*b* is not limited to a quadrupole mass spectrometer, for which the ion trap mass spectrometer described above is a typical example. It is possible to adopt any type of mass spectrometer as long as it is able to conduct mass spectrometry. For example, it is possible to adopt a publicly known mass spectrometer, such as a magnetic field type, a time-of flight type, an ion cyclotron type and the like.

Figure 4:
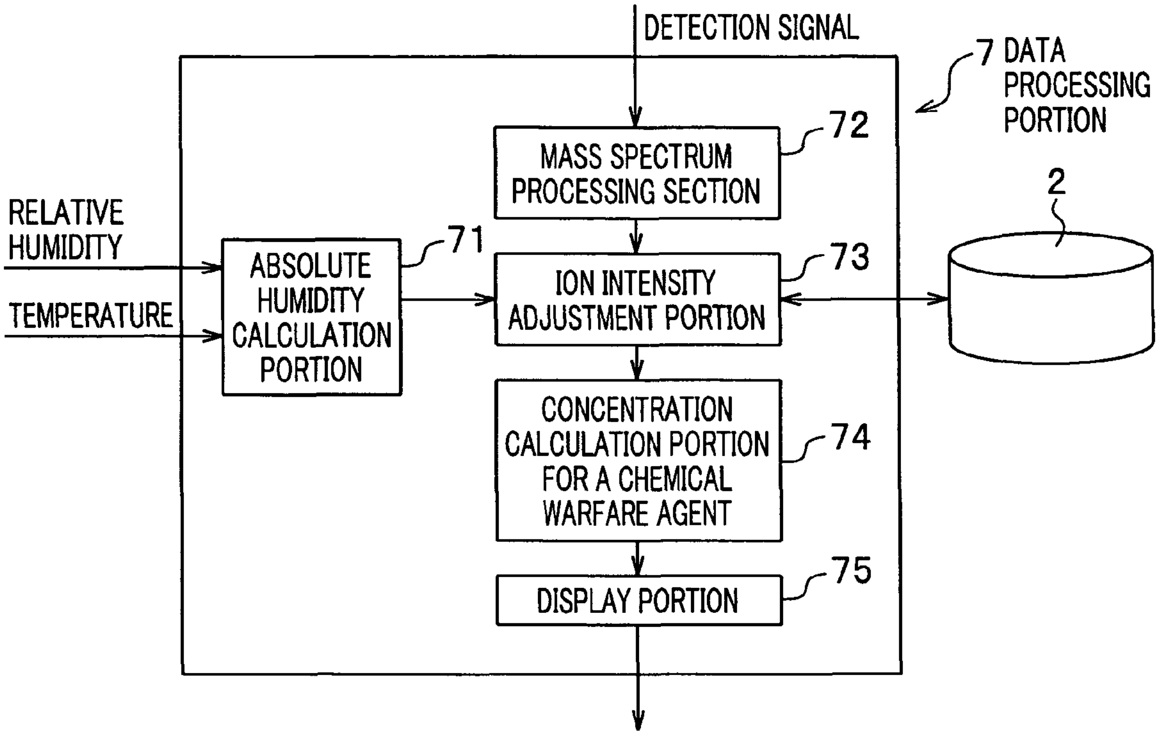
FIG. 4 is a block diagram showing structure of a data processing portion.

As shown in FIG. 4, the data processing portion 7 includes an absolute humidity calculation portion 71, a mass spectrum processing portion 72, an ion intensity adjustment portion 73, a concentration calculation portion 74 for a chemical warfare agent and a display portion 75.

In this connection, the data processing portion 7 includes a Central Processing Unit (CPU), memories such as a Read Only Memory (ROM) and Random Access Memory (RAM) and a hard disk device. Each of the portions 71-75 residing in the data processing portion 7 corresponds to a computer program or data stored in a memory or a hard disk device. When the CPU loads a computer program on a memory to conduct execution, processing assigned to each portion of the data processing portion 7 is implemented.

The absolute humidity calculation portion 71 calculates absolute humidity from relative humidity measured by the humidity sensor 4 and temperature measured by the temperature sensor 5.

Absolute humidity calculated by the portion 71 is sent to the ion intensity adjustment portion 73.

Receiving signals detected by the mass analysis portion 6*b*, the mass spectrum processing portion 72 generates ion intensity in the form of a mass spectrum according to a mass to charge ratio (m/z).

The mass spectrum generated by the mass spectrum processing portion 72 is sent to the ion intensity adjustment portion 73.

The ion intensity adjustment portion 73 selects ion intensity relevant to an object chemical warfare agent from the mass spectrum, adjusting this ion intensity according to absolute humidity at a measurement.

Description is given of steps carried out by the ion intensity adjustment portion 73 to select ion intensity from a mass spectrum so as to adjust it according to absolute humidity at a measurement.

The ion intensity adjustment portion 73 selects ion intensity relevant to an object chemical warfare agent from the mass spectrum. In this embodiment to which atmospheric pressure chemical ionization is applied, it is preferable but not necessary to adopt ion intensity for molecular weight related ion.

The ion intensity adjustment portion 73 searches the database DB2 for a calibration curve between absolute humidity and ion intensity, deciding an ion intensity adjustment factor for the absolute humidity calculated by the absolute humidity calculation portion 71.

The ion intensity adjustment portion 73 adjusts the ion intensity, which is obtained from the mass spectrum, by multiplying it by the adjustment factor according to the absolute humidity at the measurement.

The ion intensity after adjustment is sent to the concentration calculation portion 74 for a chemical warfare agent.

The concentration calculation portion 74 calculates concentration of an object chemical warfare agent receiving the ion intensity after adjustment calculated by the ion intensity adjustment portion 73. More specifically speaking, the concentration calculation portion 74 transforms the ion intensity after adjustment into concentration using a predetermined transformation factor, which is determined beforehand according to the sensitivity and the like of a mass spectrometer.

The concentration of the chemical warfare agent calculated by the concentration calculation portion 74 is sent to the display portion 75.

The display portion 75 displays the concentration of the chemical warfare agent calculated by the concentration calculation portion 74 on the display 8 (see FIG. 1). This concentration includes the adjustment taking into account an effect caused by an amount of water vapor as a coexisting material in the sample gas.

It may be possible to add a portion for comparing concentration with a threshold (not shown) in the display portion 75. In this way, it may be possible to provide an indication of alarm and alert on the display 8 when a concentration exceeds the threshold.

g. Method for Adjusting Ion Intensity

Figure 5:
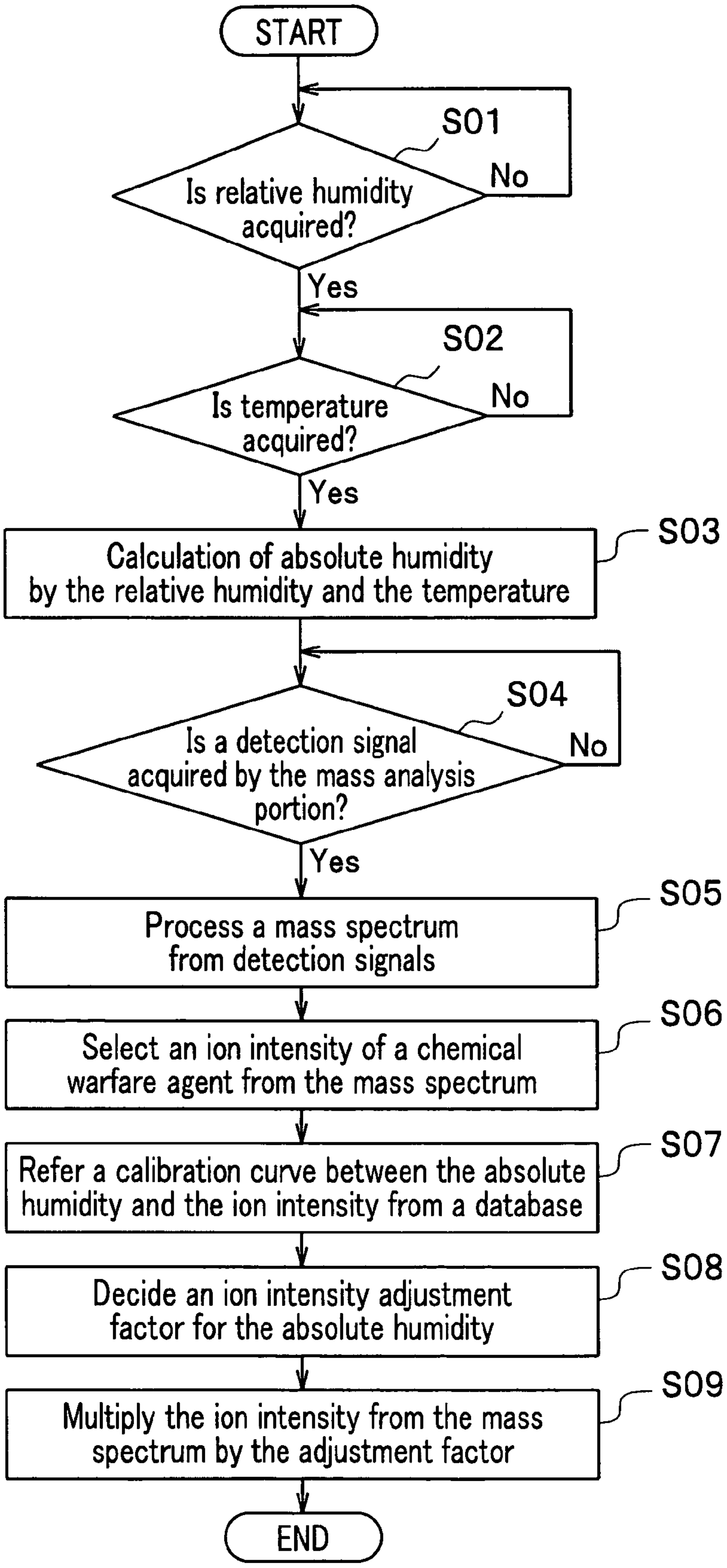
FIG. 5 is a flow chart showing processing for adjusting ion intensity.

Description is given of an example of method for adjusting ion intensity with a gas monitoring apparatus 1 according to the present invention, with reference to FIG. 5.

First, the absolute humidity calculation portion 71 of the data processing portion 7 acquires relative humidity from the humidity sensor 4 (step S01). If relative humidity is not acquired (No in S01), the portion 71 retries processing in step S01. If relative humidity is acquired (Yes in S01), the portion 71 proceeds to acquiring temperature from the temperature sensor 5 (step S02). If temperature is not acquired (No in S02), the portion 71 retries processing in step S02. If temperature is acquired (Yes in S02), the portion 71 proceeds to subsequent processing.

The portion 71 calculates absolute humidity based on the acquired relative humidity and temperature (step S03).

Next, the mass spectrum processing portion 72 of the data processing portion 7 acquires signals detected by the mass analysis portion 6*b* (step S04). If the signals are not acquired (No in S04), the portion 72 retries processing in step S04. If the signals are acquired (Yes in S04), the portion 72 proceeds to subsequent processing.

The portion 72 processes a mass spectrum from the detected signals (step S05).

The ion intensity adjustment portion 73 of the data processing portion 7 selects ion intensity of an object chemical warfare agent from the mass spectrum (step S06). As described above, the ion of the object chemical warfare agent is a molecular weight related ion, for example.

The portion 73 refers a calibration curve between absolute humidity and ion intensity from the chemical warfare agent DB2 (step S07), deciding an ion intensity adjustment factor according to the calculated absolute humidity (step S08).

The portion 73 multiplies the ion intensity, which is obtained from the mass spectrum, by the ion intensity adjustment factor so as to adjust the ion intensity for the absolute humidity at the measurement (step S09).

Because, as described above, ion intensity after adjustment is correlated by a predetermined transformation factor with concentration of a chemical warfare agent in a sample gas under absolute humidity at a measurement, it is possible to easily calculate concentration of the chemical warfare agent if ion intensity after adjustment is obtained.

h. Example of Application

Description is given of an example, in which concentration of a chemical warfare agent in air discharged from a tent 22 for surrounding soil is monitored by a gas monitoring apparatus 1 according to this embodiment, with reference to FIG. 1.

As shown in FIG. 1, soil 21 is isolated by the tent 22. This is due to the fact that careful control is requested to impose on the soil 21, obtained during excavation and collection of abandoned chemical weaponry, which is likely not only to be contaminated with a chemical warfare agent, but also to possess undiscovered containers.

The air inside the tent 22 is continuously discharged by an air supply fan 23, introducing outside air into the tent 22 via an inlet 33. This continuously maintains a pressure inside the tent 22 negative as a result of a balance between suction and exhaustion. In this way, when a gas including a chemical warfare agent escapes inside the tent, it is possible to prevent the gas from leaking out from the tent 22.

The exhaust pipe 25 for discharging the air inside the tent 22 into the outside has a filter 24, such as an activated charcoal filter, for removing chemical warfare agents, so that it is possible to prevent leakage of a gas, which contains chemical warfare agents, in case it escapes during an operation in the tent. However, it is necessary to monitor the exhaust pipe 25 in case of a trouble associated with the filter 24 (breakage, for example). Accordingly, a configuration is adopted, in which the line 3 of the gas monitoring apparatus 1 according to this embodiment is connected with the exhaust pipe 25 to monitor a gas in the exhaust pipe 25.

In this type of application described above, a coexisting material, which may have an effect on monitoring of an object chemical warfare agent, is principally water vapor.

For example, shortly after replacement of the filter 24, it is possible that humidity of a sample gas traveling via the exhaust pipe 25 extremely drops as a result of trapping of water vapor by the filter 24. As the filter 24 accumulates its operation hours, an amount of water vapor to pass through the filter 24 will increase. A change in the amount of water vapor described above will have an effect on detection of a chemical warfare agent.

Accordingly, in this example of application, description is given of a case where water vapor is assumed to be a coexisting material for an object chemical warfare agent.

When a mustard gas is an object to be monitored, a positive ionization mode is used, in which positive ions are produced by imposing positive high voltage on a needle electrode 37 (see FIG. 2).

In this connection, typical ionization reaction of the positive ionization mode is categorized into the following two reactions.

(Positive Ionization Reaction 1)

A nitrogen molecule, which is ionized by corona discharge, ionizes water vapor in the atmosphere to produce a hydronium ion [H3O+] as a primary ion. A chemical warfare agent produces a proton added molecular weight related ion [(M+H)+] by reaction with the hydronium ion.

(Positive Ionization Reaction 2)

A nitrogen molecule, which is ionized by corona discharge, directly produces a molecular ion [M+].

As an ion of the mustard gas is observed in a mass spectrum (not shown) as a mass to charge ratio m/z (molecular weight/valence)=158, which indicates M+, it is considered that a reaction with nitrogen molecular ions (positive ionization reaction 2) is predominant.

Because a charge of a nitrogen molecular ion is transformed into a hydronium ion if much water vapor exists in the atmosphere, ionization reaction of mustard gas will be difficult to happen.

In this way, dependence of ion intensity of mustard gas on humidity tends to show a monotonic decrease.

When monitoring is carried out for 2-chloroacetophenone, a positive ionization mode is applied, in which positive high voltage is imposed on a needle electrode 37 so as to produce positive ions.

As an m/z=155 is observed in a mass spectrum (not shown), which indicates a proton added molecular weight related ion [(M+H)+], it is considered that ionization of 2-chloroacetophenone is a positive ionization reaction 1. Accordingly, it is a prerequisite that a hydronium ion should be produced so that the 2-chloroacetophenone is ionized.

Figure 7:
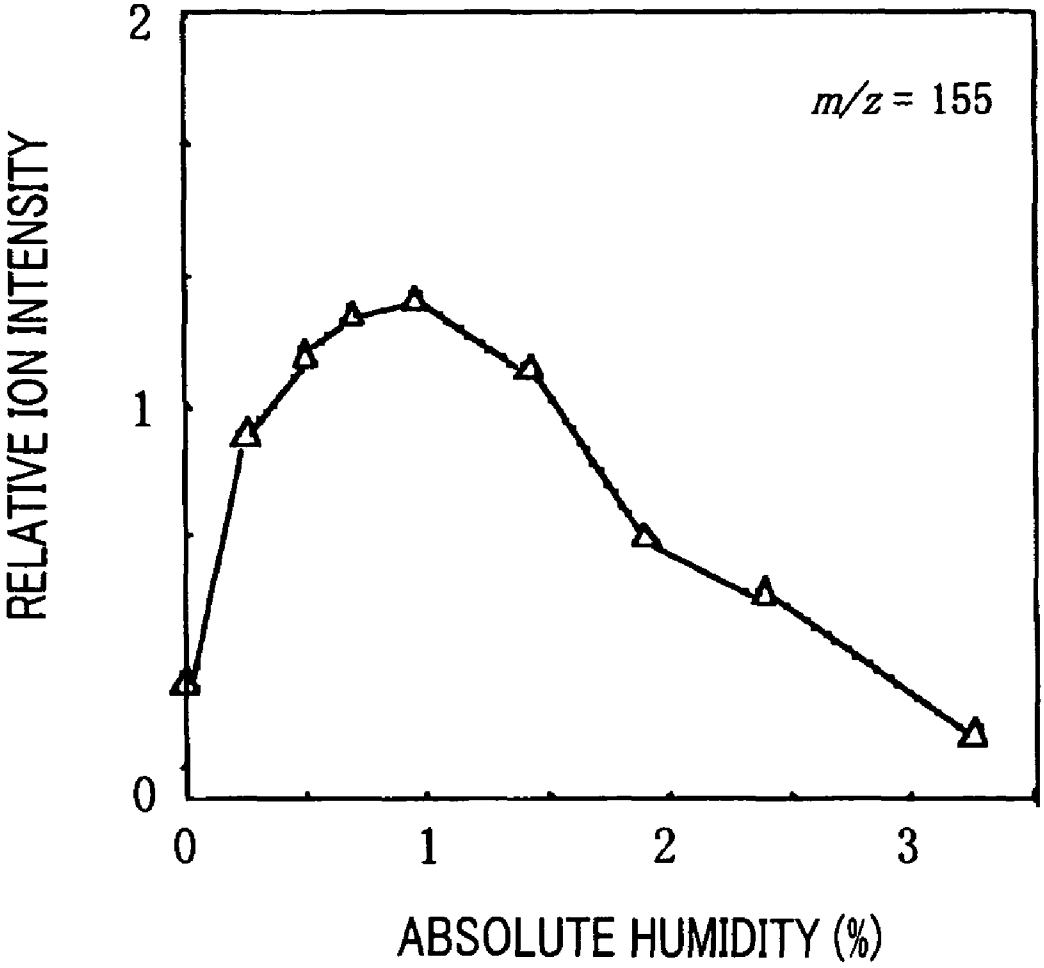
FIG. 7 is a graph showing relationship between ion intensity of molecular weight related ion for 2-chloroacetophenone and absolute humidity.

This results in an increase in ion intensity according to an increase in humidity, as shown in FIG. 7. However, as the humidity further increases, a clustering reaction occurs, in which water molecules adhere to hydronium ions. Because reactivity of a hydronium ion decreases as the size of a cluster increases, ionization efficiency of 2-chloroacetophenone decreases if humidity is too high, which results in a gradual decrease in the ion intensity.

As described above, the ion intensity of 2-chloroacetophenone tends to show that it has a maximum value around an absolute humidity of 0.9% and decreases on lower and higher sides of this absolute humidity.

As 2-chloroacetophenone is a material on which relatively less strict control is imposed among chemical warfare agents, it is sometimes used as a reference (standard material) in measuring a mustard gas.

Use of 2-chloroacetophenone as a standard material under normal life environments poses few problems when absolute humidity is not less than approximately 1% (relative humidity of 30% at the temperature of 20 degrees Celsius). This is attributed to the fact that ionization efficiency decreases for both mustard gas and 2-chloroacetophenone as humidity increases.

On the other hand, in a sample gas having very low humidity, which occurs shortly after replacement of a filter and the like, ionization efficiency of mustard gas increases, but in contrast, ionization efficiency of 2-chloroacetophenone decreases. This results in a great difference in ionization efficiency between these two materials. In this way, ion intensity and concentration are also different between the two materials.

Therefore, it is important to adjust ion intensity according to absolute humidity at a measurement, not only for a measurement of concentration of an object chemical warfare agent but also a measurement of concentration of a standard material at a calibration.

When Lewisite 1 is monitored as an abject material, a negative ionization mode is applied, in which negative high voltage is imposed on a needle electrode 37.

In the negative ionization mode, the following negative ionization reaction is carried out.

(Negative Ionization Reaction)

An oxygen molecule, which is ionized by corona discharge, directly generates a molecular ion [M−].

Figure 8:
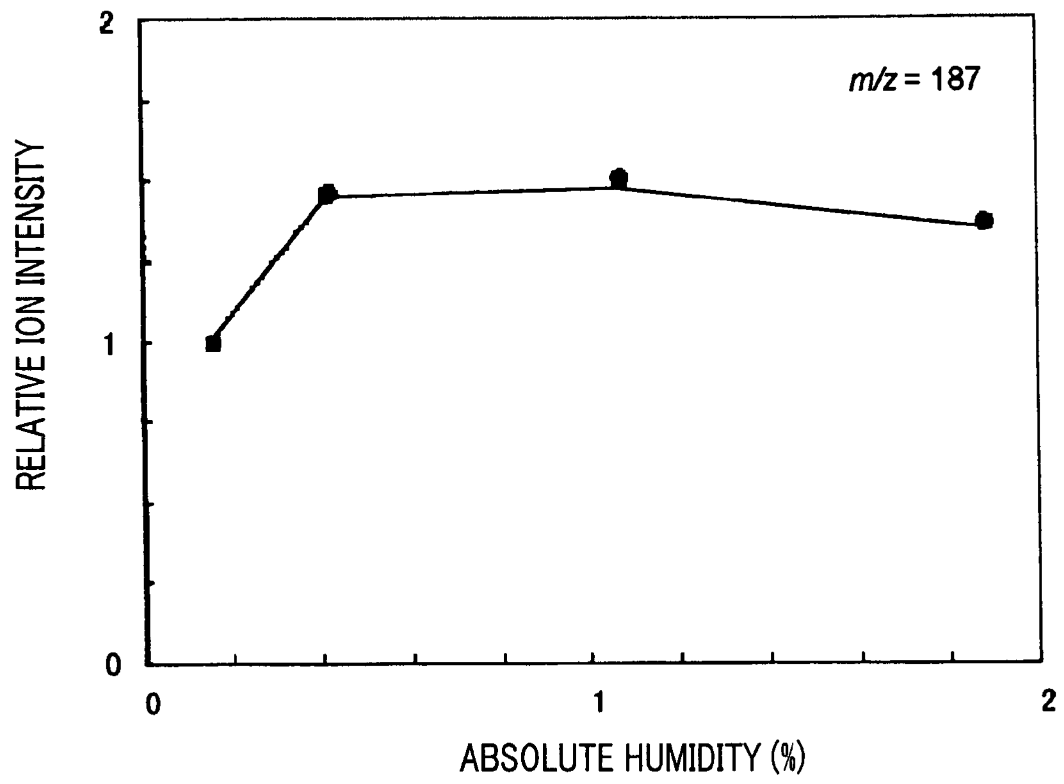
FIG. 8 is a graph showing relationship between ion intensity of molecular weight related ion for Lewisite 1, which is a principal ingredient of Lewisite, and absolute humidity.

As shown in FIG. 8, in negative atmospheric pressure chemical ionization, ion intensity also varies according to humidity. The reason for this is considered that a signal of m/z=187, which is used as a marker for detecting Lewisite 1, is an ion deriving from a hydrolysate, which results from a reaction between Lewisite 1 and water vapor in a gaseous phase.

Similarly, in negative atmospheric pressure chemical ionization, reactivity of O2−, a primary ion, varies according to clustering with water molecules.

As described above, it seems reasonable to consider that materials other than Lewisite 1 also have ion intensity depending on humidity. Accordingly, it is necessary to adjust ion intensity according to absolute humidity for a measurement of concentration with the negative ionization mode.

In order to conduct correct monitoring of concentration of a chemical warfare agent, it is necessary to adjust a measured value according to absolute humidity, irrespective of polarity of an ion (positive or negative).

Figure 6:
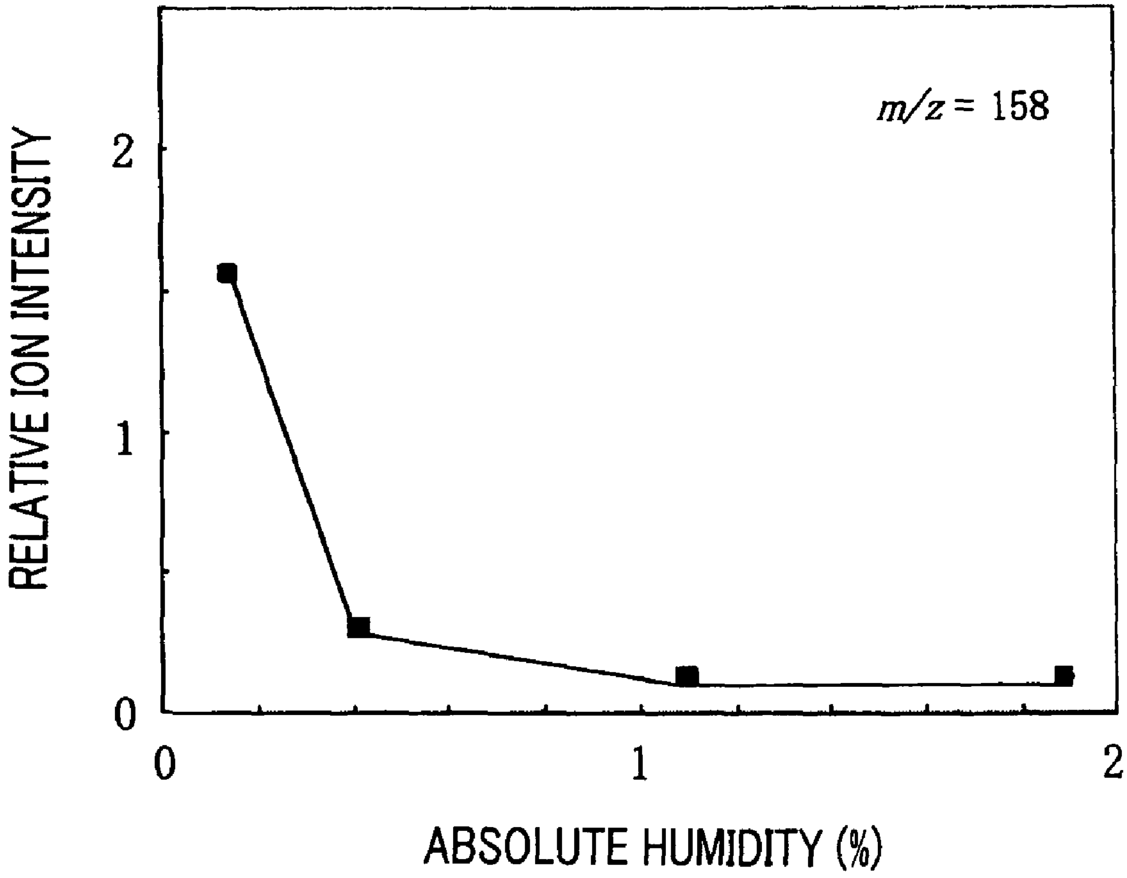
FIG. 6 is a graph showing relationship between ion intensity of molecular weight related ion for mustard gas and absolute humidity.

If data showing relationship between ion intensity of a molecular weight related ion and absolute humidity as shown in FIGS. 6-8 is acquired, it is possible to easily generate a calibration curve between absolute humidity and ion intensity, which is stored in the database DB2 and applied to processing carried out in the ion intensity adjustment portion 73.

Although water vapor is assumed as a coexisting material with respect to an object chemical warfare agent in the example of application described above, any chemical material can be a coexisting material. If data showing relationship between a chemical warfare agent and a coexisting material is obtained and stored beforehand in a database DB2, it is possible to apply this embodiment in the same manner as a case where water vapor is a coexisting material.

In a case of chemical terrorism where terrorists do not have matured technical potential, for example, it sometimes occurs that a chemical warfare agent is disseminated with an organic solvent, which is used during manufacturing of the chemical warfare agent. One example of this type of organic solvent (coexisting material) is acetone.

It is difficult to acquire information on concentration for an organic solvent with a dedicated sensor such as a humidity sensor 4, different from water vapor. It may be possible to calculate concentration of an organic solvent by deciding ion intensity of an ion deriving from the organic solvent as an index representing concentration of the organic solvent, in addition to ion intensity of an ion deriving from an object chemical warfare agent, from a mass spectrum of ions detected by the mass analysis portion 6*b*.

It may be alternatively possible to introduce a sensor for an organic solvent, which detects concentration of the organic solvent with color-developing reaction, for example.

Second Embodiment

The present invention is not limited to the first embodiment described above.

Figure 9:
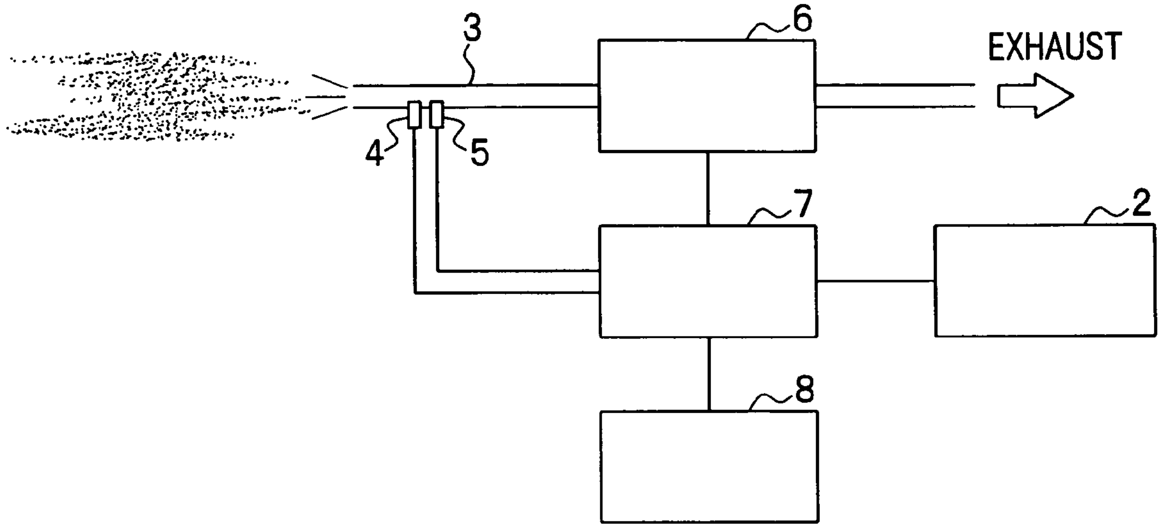
FIG. 9 is a block diagram showing structure of a gas monitoring apparatus according to another embodiment of the present invention.

As shown in FIG. 9, a line 3 for guiding gas is not connected with an exhaust pipe 25, but it may be alternatively possible to directly introduce a sample gas from the atmosphere. In this case, it is preferable but not necessary to dispose a humidity sensor 4 and a temperature sensor 5 in the line 3.

This configuration of a gas monitoring apparatus 1 described above, which becomes more portable, provides a benefit that the gas monitoring apparatus 1 can be efficiently used when a chemical warfare agent disseminated into the atmosphere is directly detected, for example.

Third Embodiment

In a third embodiment, a humidifier 65 for increasing humidity of a sample gas is provided instead of adjusting ion intensity according to absolute humidity at a measurement.

Figure 10:
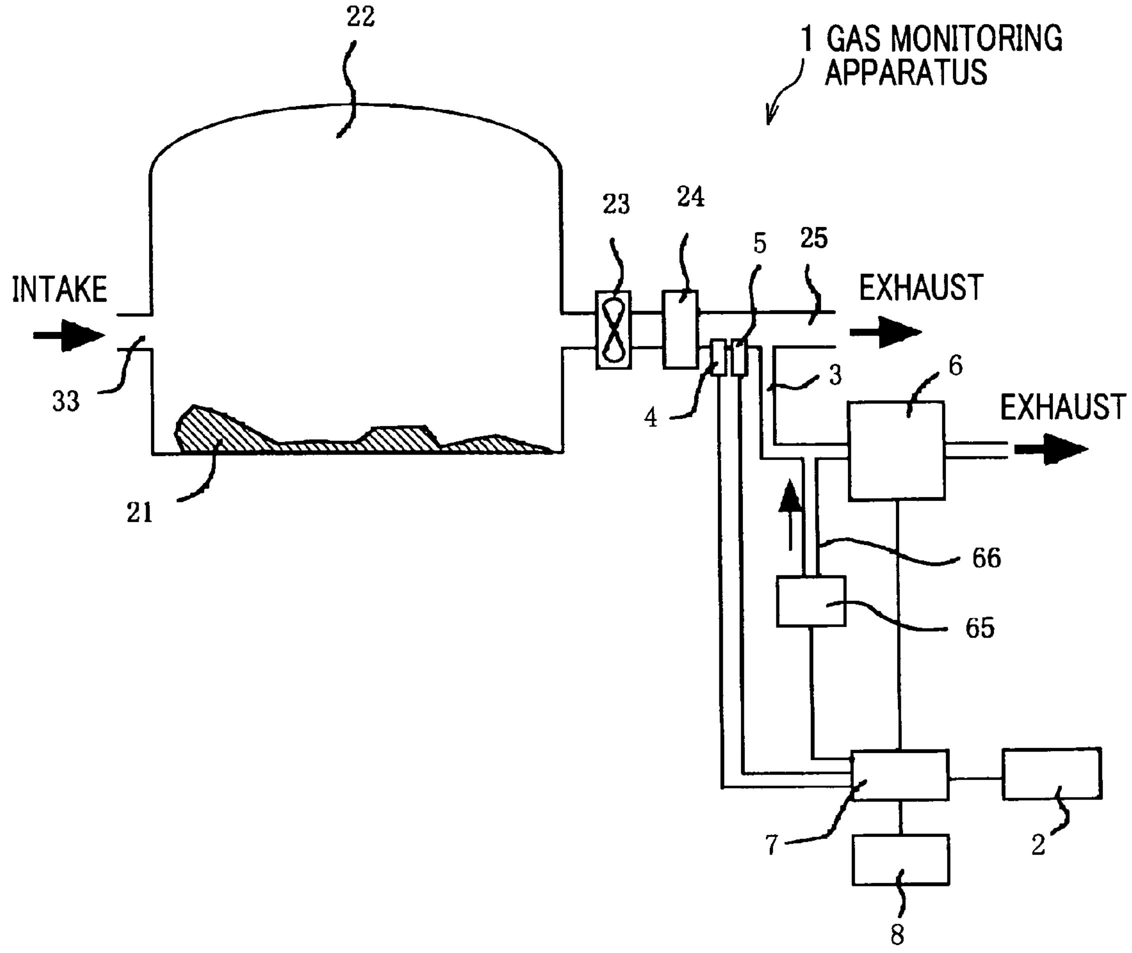
FIG. 10 is a block diagram showing structure of a gas monitoring apparatus according to still another embodiment of the present invention.
Figure 11:
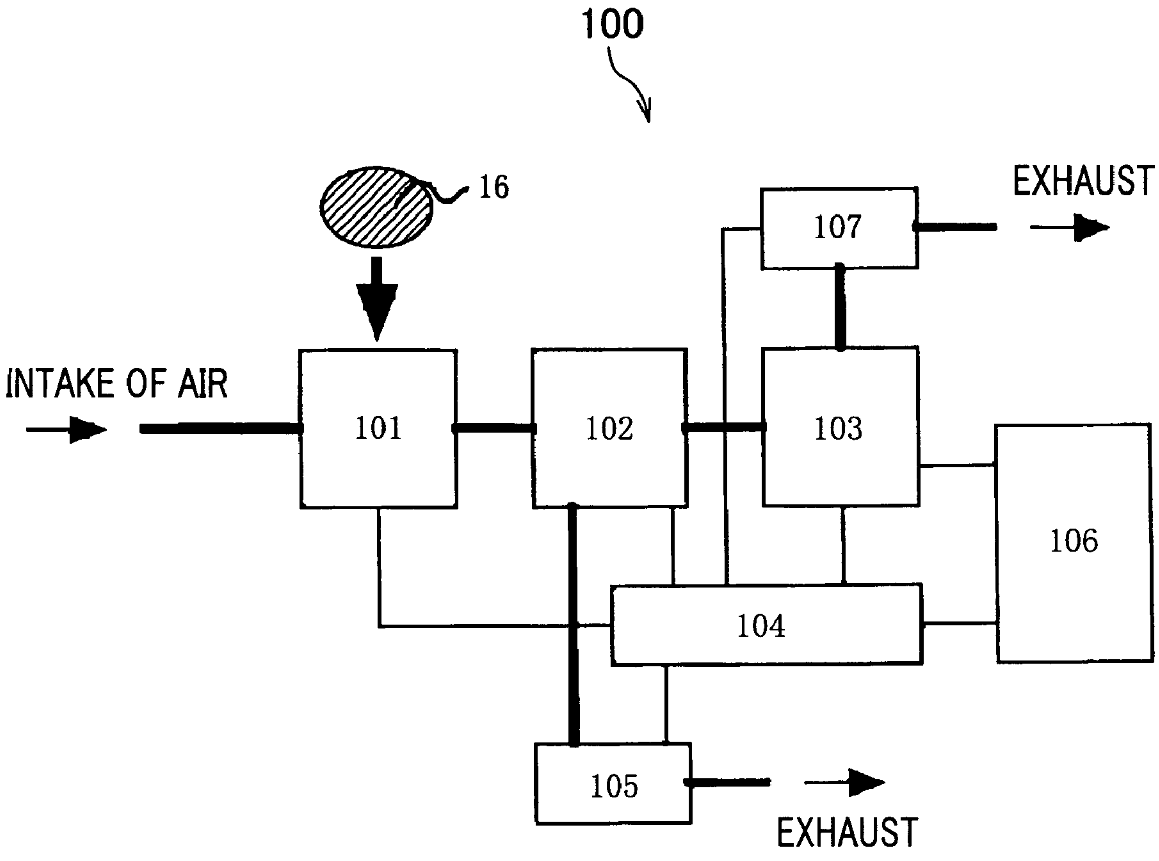
FIG. 11 is a block diagram showing structure of a conventional apparatus for detecting a chemical warfare agent.

As items shown in FIG. 10 are the same as those shown in the first embodiment, description is not repeated, bearing the same symbols.

As shown in FIG. 10, the humidifier 65 is disposed so as to adjust concentration of water vapor in a sample gas, which is sent to a detecting portion 6 for chemical warfare agent. Water vapor supplied by the humidifier 65 is introduced into a line 3 for guiding gas via a line 66 for guiding water vapor.

In this connection, an amount of water vapor introduced from the humidifier 65 is controlled according to calculation, which is carried out based on data measured by a humidity sensor 4 and a temperature sensor 5.

For example, when absolute humidity falls in less than 1%, shortly after replacement of a filter 24 for removing chemical warfare agents, for example, an amount of water vapor and its concentration, which is supplied by the humidifier 65, are controlled so that absolute humidity of the sample gas introduced into the detecting portion 6 meets the predetermined value (1%, for example).

A gas monitoring apparatus 1 configured as described above is able to conduct a measurement with the same absolute humidity, which is implemented by the humidifier 65, even if absolute humidity of the atmosphere differs a measurement to another in plural number of measurements. This enables acquisition of correct ion intensity ratio (concentration ratio, namely) without adjustment.

In this connection, a device for controlling concentration of water vapor contained in the sample gas is not limited to the humidifier, but it may be alternatively possible to adopt a dehumidifier.

The present invention, which is able to promptly and correctly acquire concentration of a chemical warfare agent, contributes to improvement of safety for residents, when monitoring of a chemical warfare agent leaked into the environment is carried out and in case of a chemical terrorism attack.

What is claimed is:

1. A gas monitoring apparatus comprising:

a sample introducing portion for introducing a sample gas including an object material to be measured;

a humidity sensor for measuring humidity of the sample gas;

a humidity controller for adjusting concentration of humidity of the sample gas;

an ionization portion for ionizing the sample gas;

a mass analysis portion for analyzing mass of an ion produced by the ionization portion;

a data processing portion for analyzing signals detected by the mass analysis portion to calculate a concentration of the object material; and a display for displaying results of analysis conducting by the data processing portion, wherein the processing portion comprises an adjustment portion, said adjustment portion adjusts the humidity controller to control the humidity of the sample gas to be a predetermined value.

2. The gas monitoring apparatus according to claim 1, wherein the humidity controller is a humidifier or dehumidifier.

3. The gas monitoring apparatus according to claim 1, further comprising a temperature sensor, wherein the adjustment portion adjusts the humidity based on a measured result of the humidity sensor and the temperature sensor.

* * * * *